United States Patent
Han et al.

(10) Patent No.: US 6,389,962 B1
(45) Date of Patent: May 21, 2002

(54) ICE CREAM VENDING MACHINE

(75) Inventors: Hong-suk Han; To-suck Ryoo, both of Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 09/977,421

(22) Filed: Oct. 15, 2001

(30) Foreign Application Priority Data

| Oct. 13, 2000 | (KR) | 2000-60451 |
| Apr. 4, 2001 | (KR) | 2001-17995 |
| Aug. 31, 2001 | (KR) | 2001-053116 |

(51) Int. Cl.[7] .............. A23L 1/00; A23G 9/00; G01F 7/00; F24C 7/12; B67D 5/10
(52) U.S. Cl. ............ 99/455; 99/452; 99/450.1; 99/494; 99/517; 62/114; 62/342; 222/63; 222/146.6
(58) Field of Search .......... 99/452–455, 460–466, 99/450.1, 450.2, 450.6, 450.7, 494, 516, 517; 62/63, 77, 136, 382, 114, 342, 343; 222/1, 2, 63, 146.6, 149.98, 325, 390, 99, 642, 190, 399, 185.1; 426/92, 93, 95, 100, 101, 282–284, 231; 221/150 HC, 150 R

(56) References Cited

U.S. PATENT DOCUMENTS

| 1,681,929 A | * | 8/1928 | De Armond et al. | ......... 99/455 |
| 2,462,019 A | * | 2/1949 | Bowman | ............... 99/275 |
| 2,707,911 A | * | 5/1955 | Charpiat | .............. 99/455 X |
| 2,712,887 A | * | 7/1955 | King | ..................... 99/275 |
| 3,803,870 A | * | 4/1974 | Conz | ..................... 62/342 |
| 3,987,715 A | * | 10/1976 | Muller | .................. 99/275 |
| 4,671,425 A | * | 6/1987 | Knoll | ............. 221/150 HC |
| 5,027,698 A | * | 7/1991 | Chirnomas | ............ 99/129.2 |
| 5,319,939 A | * | 6/1994 | McFadden et al. | ....... 62/63 |
| 5,344,046 A | * | 9/1994 | Maldanis et al. | ......... 222/2 |
| 5,464,120 A | * | 11/1995 | Alpers et al. | ........ 99/455 X |
| 5,957,040 A | * | 9/1999 | Feola | ................... 99/450.6 |
| 6,308,522 B1 | * | 10/2001 | Jones et al. | .............. 62/114 |

* cited by examiner

Primary Examiner—Timothy F. Simone
(74) Attorney, Agent, or Firm—Ladas & Parry

(57) ABSTRACT

An ice cream vending machine prevents loss of cool air when the vending machine is not in vending operation by closing a passage of a guide member. The vending machine includes a cooling system, a freezing chamber cooled by the cooling system, a canister arranged within the freezing chamber, for holding a bead type ice cream, a cup supplying device arranged outside of the freezing chamber, for supplying a cup for holding the bead type ice cream, an ice cream discharging device for discharging the bead type ice cream from the canister, a guide member having a passage for guiding the ice cream discharged by the ice cream discharging device into the cup, and an opening/closing device for selectively opening and closing a passage of the guide member. An actuator device of the opening/closing device means may comprise a resilient member.

4 Claims, 3 Drawing Sheets

ICE CREAM VENDING MACHINE

BACKGROUND OF THE INVENTION

1. Field of the Invention

The present invention relates generally to an ice cream vending machine, and more particularly to an ice cream vending machine for unattended vending of bead type ice cream, which is frozen in the form of granules having a size between 3 mm–7 mm in diameter.

2. Description of the Related Art

FIG. 1 shows a conventional ice cream vending machine. The vending machine shown in FIG. 1 is disclosed herein as reference art that describes a device belonging to the common assignee with this invention. It has not been disclosed to the public as of the filing date of the priority document. Accordingly, the device shown in FIG. 1 does not qualify as prior art in a non-obviousness rejection of the present invention.

Meanwhile, as shown in FIG. 1, the conventional ice cream vending machine includes a cooling system 10, a freezing chamber 20, a canister 30, a cup-supplying device 40, an ice cream discharging device 50, a chute 60, and a guide member 70.

The cooling system 10 is substantially identical to a general refrigeration device. Once cooled by the cooling system 10, the air is blown into the freezing chamber 20 by a blower 11. Inside of the freezing chamber 20, a canister 30 is arranged.

The canister 30 is filled with a bead type ice cream that is frozen into granular shapes being 3–7 mm in diameter. The freezing chamber 20 is maintained at a freezing temperature approximately from about −43° C. to −27° C.

The cup-supplying device 40 is arranged outside of the freezing chamber 20 to supply a cup 41 for holding ice cream. The ice cream discharging device 50 is disposed underneath and adjacent the lower portion of the canister 30. The cup-supplying device 40 and the ice cream discharging device 50 are substantially identical to ones known, and do not comprise a specific feature of the invention.

The chute 60 is arranged underneath a discharging port 51 of the ice cream discharging device 50 to collect the discharged ice cream into a predetermined path. Also, the guide member 70 is arranged on the lower side of the chute 60 to guide the discharge ice cream into the cup 41.

In the conventional ice cream vending machine constructed as above, first a customer inputs a coin of a predetermined amount into the vending machine and then presses a selection button. Accordingly, by the cup-supplying device 40, the cup 41 is supplied to a predetermined location at the lower side of the guide member 70.

Next, the ice cream discharging device 50 is operated, and accordingly, the ice cream is discharged. The discharged ice cream is discharged into the cup 41 through the chute 60 and a passage 71 of the guide member 70, permitting the customer to pull out the cup 41 and enjoy the ice cream.

In conventional ice cream vending machines, however, even when the vending machine is not in vending operation, the interior of the freezing chamber 20 remains interconnected with the exterior through a passage 71 of the guide member. Accordingly, cool air leaks out of the freezing chamber 20 through the passage 71 of the guide member 70, and consequently, there is an unnecessary consumption of electricity for operating the cooling system 10 to maintain appropriate temperature of the freezing chamber 20.

SUMMARY OF THE INVENTION

The present invention has been made to overcome the above-mentioned problems of the related art, and accordingly, it is an object of the present invention to provide an ice cream vending machine capable of preventing loss of cool air by closing the passage of the guide member when the vending machine is not in vending operation.

The above object is accomplished by an ice cream vending machine in accordance with the present invention, including a cooling system, a freezing chamber cooled by the cooling system, a canister, arranged within the freezing chamber, for holding a bead type ice cream, a cup supplying device, arranged outside of the freezing chamber, for supplying a cup to hold the bead type ice cream, an ice cream discharging device for discharging the bead type ice cream from the canister, a guide member having a passage for guiding the ice cream discharged by the ice cream discharging device into the cup, and an opening/closing means for selectively opening and closing a passage of the guide member.

Here, the passage opening/closing means includes a passage opening/closing member and a conveying means for conveying the passage opening/closing member. The passage opening/closing member conveying means includes various proper well-known methods, such as using a solenoid or an electric motor as an actuator.

BRIEF DESCRIPTION OF THE DRAWINGS

The above-mentioned objects and the feature of the present invention will be more apparent by describing the preferred embodiment of the present invention in detail referring to the appended drawing, in which.

DETAILED DESCRIPTION OF THE PREFERRED EMBODIMENTS

The preferred embodiments of the present invention will now be described in detail with reference to the accompanying drawing figures.

Figure 1:
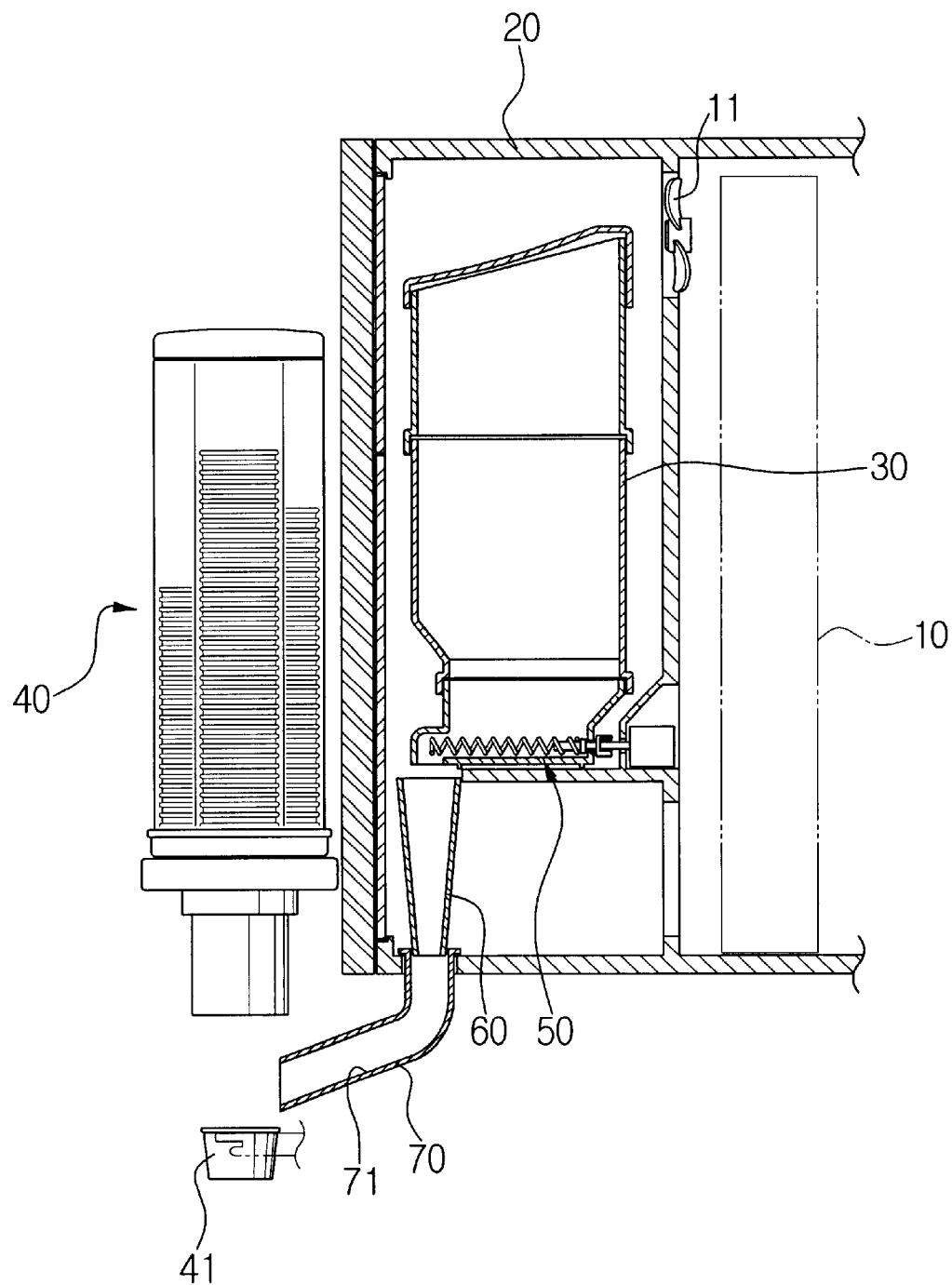
FIG. 1 is a partially cut-away view showing a known ice cream vending machine.
Figure 2:
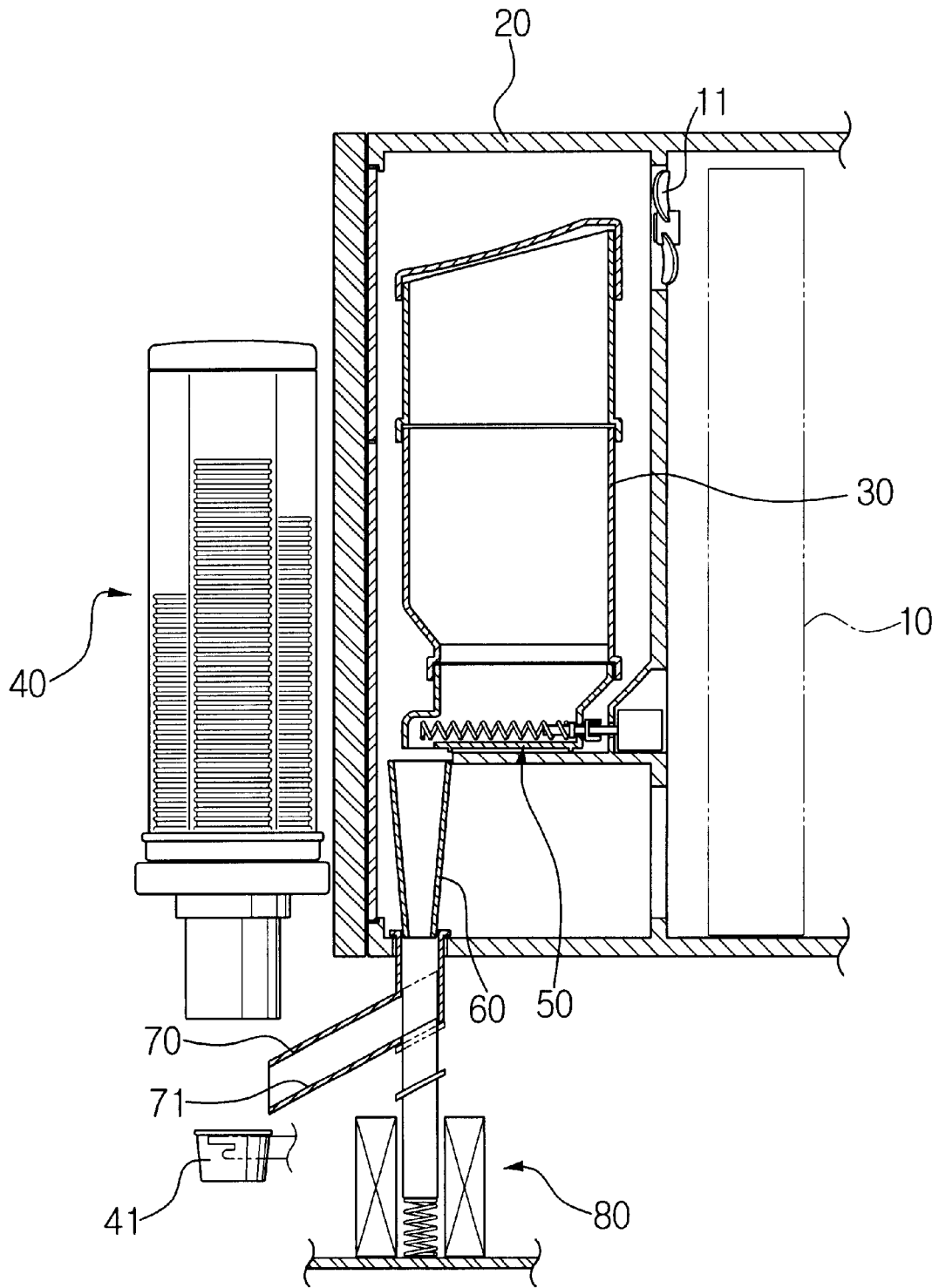
FIG. 2 is a partially cut-away view showing an ice cream vending machine in accordance with the present invention.

FIG. 2 shows an ice cream vending machine in accordance with the present invention. As shown in FIG. 2, the vending machine includes a cooling system 10, a freezing chamber 20, a canister 30, a cup-supplying device 40, and an ice cream discharging device 50.

The cooling system is substantially identical to a general refrigeration cycle device. Once cooled by the cooling system 10, the air is blown into the freezing chamber 20 by a blower 11. The canister 30 is arranged within the freezing chamber 20.

The canister 30 is filled with a bead type ice cream that is frozen into the shape of granules being from 3 mm–7 mm in diameter. The canister 30 is maintained at the temperature ranging from −43° C. to −27° C. to maintain the granule shape of the ice cream in a frozen state.

The cup-supplying device 40 is arranged outside of the freezing chamber 20 to supply a cup 41 for holding the discharged ice cream. The ice cream discharging device 50 is disposed at the lower portion of the canister 30. The cup-supplying device 40 and the ice cream discharging device 50 are substantially identical to ones known in the art.

Underneath the discharging port of the ice cream discharging device 50, a chute 60 is arranged to collect the discharged ice cream and guide it toward a predetermined location. Also, on the lower side of the chute 60 is a guide member 70 having a passage 71 for guiding the discharged ice cream to the cup 41.

On one side of the guide member 70, an opening/closing means is arranged to selectively open and close the passage 71 of the guide member 70. When the vending machine is not in vending operation, the passage 71 of the guide member 70 is closed by the passage opening/closing means.

Figure 3:
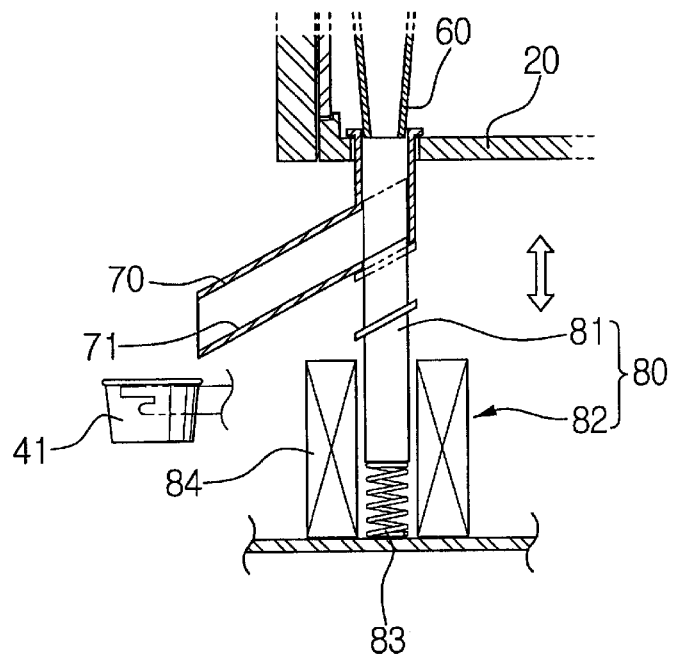
FIG. 3 is a cut-away, detail view showing a passage opening/closing means of the vending machine of FIG. 2 in accordance with one preferred embodiment of the present invention.

FIG. 3 shows in greater detail the passage opening/closing means of the ice cream vending machine in accordance with the present invention. Referring to FIG. 3, the passage opening/closing means 80 includes a passage opening/closing member 81, and a conveying means 82 for conveying the passage opening/closing member 81.

In this embodiment, the passage opening/closing member 81 includes, at least in part, a magnetic material, and the passage opening/closing member conveying means 82 includes a resilient member 83 and a solenoid 84. The elastic member 83 normally biases the passage opening/closing member 81 to a closing position.

When electricity is applied, the solenoid 84 conveys the passage opening/closing member 81 to an opening position against the elasticity of the resilient member 83. When electricity is not applied, the passage 71 of the guide member 70 is normally closed by the resilient member 83

Figure 4:
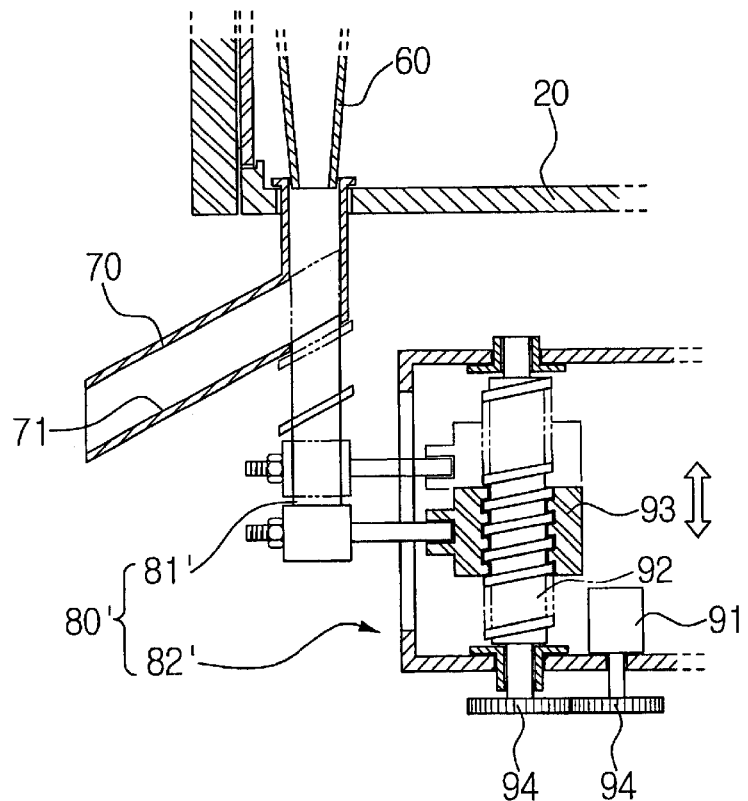
FIG. 4 is a cut-away, detail view showing a passage opening/closing means of the vending machine of FIG. 2 in accordance with another preferred embodiment of the present invention.

FIG. 4 shows the passage opening/closing means of the ice cream vending machine in accordance with another preferred embodiment of the present invention. Referring to FIG. 4, the passage opening/closing means 80' includes a passage opening/closing member 81' and a conveying means 82' for conveying the passage opening/closing member 81'.

In this preferred embodiment shown in FIG. 4, the passage opening/closing conveying means 82' includes an electric motor 91, a screw member 92, and a nut member 93. A rotary shaft of the electric motor 91 and the screw member 92 are connected with each other through a power transmitting means such as gears 94.

The passage opening/closing member 81' is attached to one side of the nut member 93. Accordingly, as the screw member 92 is rotated, the nut member 93 is moved linearly. That is, when the electric motor 91 is rotated in one direction, the passage opening/closing member 81' is moved upward and when rotated in the other direction, the opening/closing member 81' is moved downward.

Although in this embodiment the passage opening/closing member 81' is moved upward and downward by the alternating rotation of the electric motor 91, other alternative arrangements are possible. For example, the passage opening/closing member 81' can be designed to be moved upward and downward by unidirectional rotation of the electric motor 91.

For the upward and downward movement of the passage opening/closing member 81' by the unidirectional rotation of the motor, a rotary shaft having a cam groove and a cam nut can be used instead of the screw member and the nut member. Also, as those skilled in the art could apply many other methods, further description thereof will be omitted here.

In the ice cream vending machine constructed as above according to the present invention, when the customer inputs a coin of a predetermined amount into the ice cream vending machine and presses the selection button, the cup 41 is supplied to a predetermined location at the lower side of the guide member 70 by the cup-supplying device 40.

Electricity is continuously applied to the solenoid 84 or the motor, which is an actuator for the passage opening/closing means 80 and 80'. Accordingly, as described above, the passage opening/closing member 81 and 81' are moved downward, and the passage 71 of the guide member 70 is opened.

Next, the ice cream discharging device 50 is operated and the ice cream is discharged. The ice cream is discharged into the cup 41 through the chute 60 and the guide member 70. Accordingly, the customer takes the cup 41 out and enjoys the ice cream.

Meanwhile, after the discharge of the ice cream, the passage opening/closing member 81 and 81' is moved upward by the resilient member 83 or the motor 91. Accordingly, the passage 71 of the guide member 70 is closed. That is, the interior of the freezing chamber 20 is closed off from fluid communication with the ambient environment outside of the ice cream vending machine while the vending machine is not in vending operation.

As described above, in the ice cream vending machine in accordance with the present invention, when the vending machine is not in vending operation, the passage 71 of the guide member 70 is closed, and accordingly, the loss of cool air from the freezing chamber 20 is prevented. As a result, electricity consumption for maintaining appropriate temperature in the freezing chamber 20 can be greatly reduced.

Although the preferred embodiments of the present invention have been described, it will be understood by those skilled in the art that the present invention should not be limited to the described preferred embodiments, but various changes and modifications can be made while utilizing the features disclosed herein within the spirit and scope of the present invention. Accordingly, the description is illustrative only, and the scope of the invention is only defined by the appended claims.

What is claimed is:

1. An ice cream vending machine, comprising:

a cooling system;

a freezing chamber cooled by the cooling system;

a canister, arranged within the freezing chamber, for holding a bead type ice cream;

a cup-supplying device, arranged outside of the freezing chamber, for supplying a cup to hold the bead type ice cream;

an ice cream discharging device for discharging the bead type ice cream from the canister;

a guide member having a passage for guiding the ice cream discharged by the ice cream discharging device into the cup; and an opening/closing means for selectively opening and closing the passage of the guide member.

2. The vending machine of claim 1, wherein the passage opening/closing means comprises a passage opening/closing member, and a conveying means for conveying the passage opening/closing member.

3. The vending machine of claim 2, wherein the conveying means comprises a resilient member for biasing the passage opening/closing member to a closed position, and a solenoid for conveying the passage opening/closing member to an open position against a force of the resilient member when electricity is applied to the solenoid.

4. The vending machine of claim 2, wherein the conveying means comprises an electric motor, a screw member rotated by the electric motor, and a nut member to which the passage opening/closing member is attached and is linearly moved by rotation of the screw member.

\* \* \* \* \*